April 12, 1949. H. B. IMES Re. 23,097
TRESTLE LEG ASSEMBLY
Original Filed Dec. 29, 1945
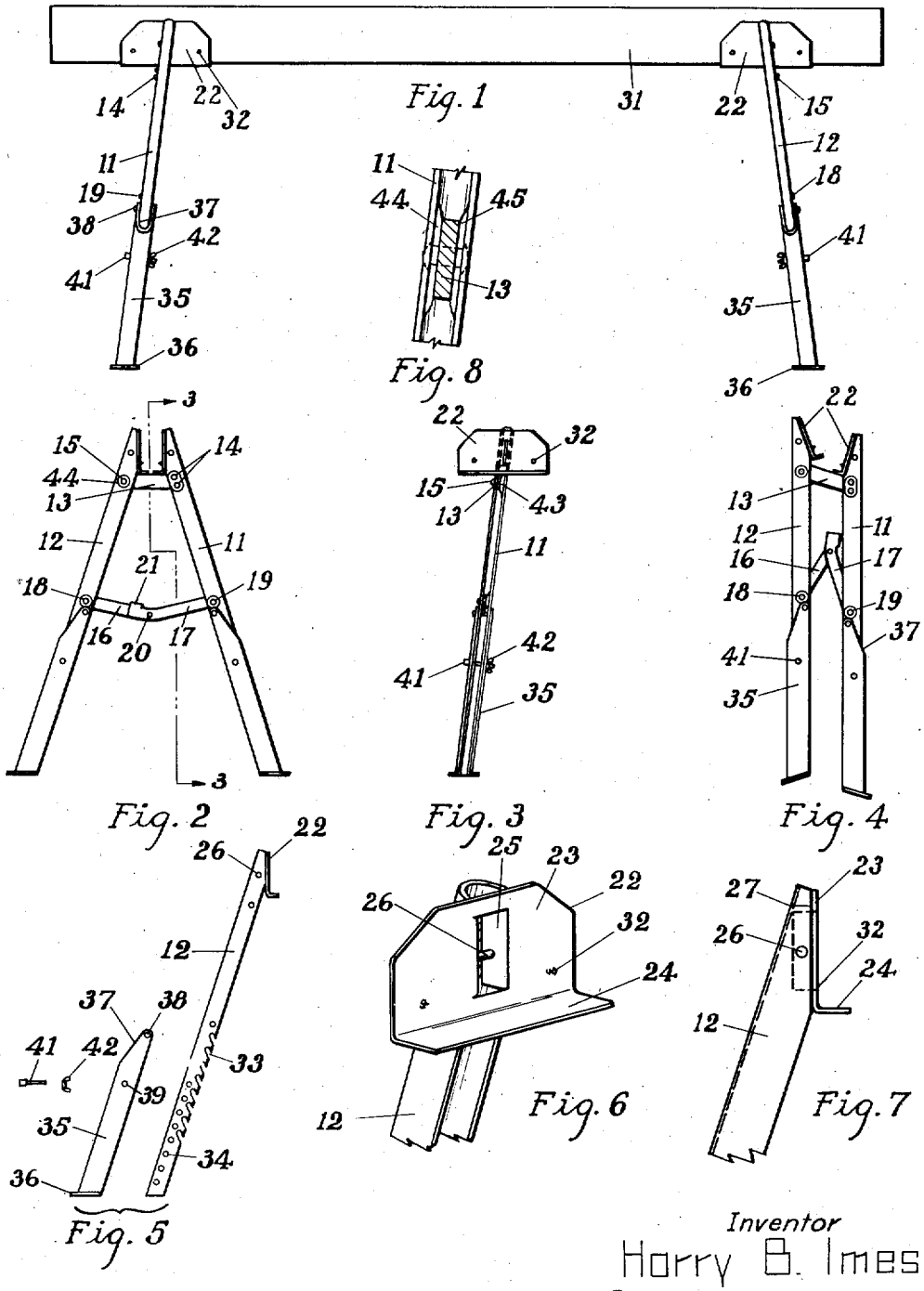
Inventor
Harry B. Imes
By Arthur F. Robert
ATTORNEY Reissued Apr. 12, 1949

Re. 23,097

UNITED STATES PATENT OFFICE 23,097

TRESTLE LEG ASSEMBLY

Harry B. Imes, deceased, late of Louisville, Ky., by Mary W. Imes, executrix, Louisville, Ky.

Original No. 2,419,778, dated April 29, 1947, Serial No. 638,328, December 29, 1945. Application for reissue March 27, 1948, Serial No. 17,461

6 Claims. (Cl. 304—5)

This invention relates to a trestle leg assembly, and more particularly to an assembly of the foldable and portable type.

Prior trestle, or as more commonly known, horse constructions have been characterized by an inherent awkward shape and bulkiness which has made them difficult to move or store. By reason of the protruding legs, they have been susceptible to breaking in handling or moving, and loosening of the joints thereof to an extent to render them useless.

It is an object of my invention to provide a novel trestle leg assembly of a foldable and portable nature that can be easily transported or stored and is substantially indestructible.

A further object of my invention is the provision of a novel trestle leg assembly, capable of being folded and easily handled when not in use, and capable of being assembled with a like leg assembly and a cross bar of conventional type such as a 2 x 4 timber to form an exceedingly rigid and strong trestle.

A further object of my invention is the provision of a novel trestle assembly of foldable character that may be quickly and easily unfolded and assembled in combination with a like leg assembly and a suitable cross bar, the leg assemblies being so formed that the desired angular relations of the legs relative to both the longitudinal axis of the cross bar and a vertical plane passing therethrough are immediately and automatically determined without the necessity of any adjustment.

A further object of my invention is the provision of a novel foldable trestle leg assembly wherein a pair of leg members are pivotally connected in association with a toggle assembly in a manner whereby the toggle assembly functions to cause the upper ends of the legs to rigidly grip a cross bar and to lock the assembly in that position.

Other objects and advantages of my invention will appear from the following description and claims taken in connection with the attached drawing, wherein:

Fig. 1 is a side elevation of a trestle or horse employing preferred embodiments of the leg assemblies of my invention.

Fig. 2 is a front elevation of one of the leg assemblies of Fig. 1.

Fig. 3 is a section taken on the line 3—3 of Fig. 2.

Fig. 4 is a view similar to that of Fig. 2 with the leg assembly shown in collapsed position.

Fig. 5 is an exploded view of one leg showing the mechanism for varying the effective length of the leg.

Fig. 6 is a perspective of a detail illustrating the manner in which the cross-bar receiving members are preferably secured to the upper ends of the legs.

Fig. 7 is a front elevation of the detail of Fig. 6.

Fig. 8 is a side elevation of a detail showing the manner in which the pins or rivets are preferably secured.

The preferred embodiment of my invention, as illustrated herein, includes two legs 11 and 12, preferably formed of channel-shaped metal with the open faces thereof facing inwardly as shown in Fig. 2. The upper ends of the legs are connected by a link 13 which is preferably connected to leg 11 in fixed or non-pivoted relation by two rivets or pins 14, and pivotally connected to leg 12 by a single pin or rivet 15 so that the legs are pivotally mounted relative to one another. While a single pin or rivet may be employed in leg 11 in lieu of double pins 14, it is preferred to fix the link to the leg in a predetermined angular relation as shown so that when the assembly is opened to the position shown in Fig. 2, the upper surface of the link is substantially horizontal and functions in part as a base for the supported cross bar.

A toggle like assembly including links 16 and 17, secured, respectively, to legs 12 and 11 by pins 18 and 19 and secured together by pin 20, is mounted below link 13, the link 17 being formed with a stop lug 21 so that when the legs are expanded and the toggle moved to the position shown in Fig. 2, the lug 21 engages the upper surface of link 16 and the leg assembly is positively locked in position. Links 16 and 17 are preferably formed of equal lengths between pins 18 and 19 and the connecting pin 20 to permit the assembly to be compactly folded as show in Fig. 4.

An angular shaped cross-bar receiving member 22 is preferably secured to the upper end of each leg above the pivotal link 13, preferably in the manner shown in Figs. 6 and 7. As shown, each member includes a substantially vertical section or rail 23 and a horizontal section or shelf 24 when viewed as in Fig. 2. The central portion of the vertical face is preferably cut and bent rearwardly to form two rearwardly extending ears 25 which are spaced apart sufficiently to fit snugly within the adjacent channel section of the leg, the ears being secured against movement by a pin or rivet 26.

Referring to Fig. 3, it will be noted that the ears 25 are cut at an angle such that when assembled with the upper end of the leg, section 24 lies in a plane at a predetermined angle to the plane passing through the longitudinal axes of the legs whereby the cross bar received therein when placed flush against section 24, automatically takes a predetermined angle with respect to the leg assembly such that the leg assembly is not vertical but at an angle from the vertical as shown in Fig. 1 to give added support to the assembly.

In forming the upper ends of each leg, the surface 27 is formed at an angle such that with the assembly expanded and the cross-bar receiving member 22 against surface 27 in flush relation, the section 23 of the member is in a substantially vertical position. Thus when the cross bar is brought flush against sections 23, the angular relation of each leg of the assembly relative to a vertical plane passing through the cross bar is predetermined.

In the folded position shown in Fig. 4, the cross-bar receiving members 22 are spaced apart as shown. However, it will be noted that the member 22 fixed to leg 11 has its section 24 substantially flush with and resting upon link 13 for added support. This relationship is maintained in and insured by the double pin arrangement 14 which secures the leg 13 to leg 11 in fixed relation. In the open position of Fig. 2, sections 24 of both members 22 rest upon link 13 and receive added support therefrom.

In combining the leg assemblies with a cross bar 31, such as a 2 x 4 timber to create the assembly shown in Fig. 1, the cross bar is normally laid flat upon the ground or floor and the leg assemblies placed thereover in folded position with the members 22 about the cross bar. The lower ends of the leg assemblies as viewed in Fig. 4 are then spread apart and the toggle assembly moved to the position shown in Fig. 2, members 22 thus being brought into firm contact and in gripping relation with the cross bar in a manner to secure it firmly. The securing of the cross bar between the members 22 is further insured by the provision of indentations 32 in the faces of members 22 which indentations project into the wood. By reason of the predetermined angular relation of members 22 with respect to the upper ends of the leg, the nesting of the cross bar between the members 22 flush against all the surfaces thereof insures the proper angular relation of the legs as shown in Figs. 1 and 3. No adjustments of any nature are required, and the resultant assembly will be found to set firmly upon a substantially level surface.

It is preferred that some means be provided to vary the effective lengths of legs 11 and 12 so that the resultant trestle can be of different heights. For this purpose, the inner surface of the lower end of each leg as shown in Fig. 5 is formed with a series of upwardly and inwardly extending notches 33 and a plurality of holes 34 through the channel walls, the spacing between notches 33 and the spacing between holes 34 being preferably the same. A separate channel member 35, preferably of slightly larger dimensions than the leg, is fitted about the lower end of the leg and arranged to nest therewith as shown in Figs. 2 and 3, the bottom of the channel section 35 being preferably formed with a flanged or footed section 36 to insure better engagement of the leg with the floor or like supporting surface. Member 35 is cut away at its upper end at 37 to provide an elongated opening and provided with a pin 38 extending through the opposing walls thereof. In assembling member 35 upon the leg, the member is turned clockwise approximately 90 degrees from the position shown in Fig. 5 and the bottom end of the leg inserted through the relatively large aperture formed by the cutting off of the channel at 37 and defined by the side walls of the channel, the rear wall thereof and pin 38. Pin 38 may be positioned in any desired notch 33 and channel section 35 rotated counterclockwise thereabout to the position shown in Fig. 2. In this position, an aperture 39 in section 35 will be aligned with one of apertures 34 in the leg whereupon a bolt 41 may be passed therethrough and secured as by a thumb nut 42. Preferably the spacing of notches 33 relative to holes 34 is such that the weight of the leg is brought upon pin 38 and its corresponding notch rather than upon bolt 41. This construction enables the effective lengths of legs 11 and 12 to be readily varied while at the same time maintaining a relative rigid leg structure, this resulting in part from the nested relation of channel section 35 about the leg. Preferably the leg assembly as shown in Fig. 2 is of a height of about 24″, the adjustments being made in 2″ increments.

To eliminate loose play between the ends of the various linkages mounted in the leg channels, I preferably indent portions of the channel surrounding the holes in which the linkage pins are received in the manner shown at the upper end of Fig. 3 wherein an indentation 43 is formed only on one side of the channel or in the manner shown in Fig. 8 wherein indentations 44 and 45 are provided on opposite sides of the channel, the inner surfaces of the indentations thus formed being spaced apart just sufficiently to receive the adjacent end of the linkage, suitable apertures being provided in the centers of the indentations for the pins. With the arrangement shown in Fig. 8, it is thus possible to bring all the rivet or pin heads within the dimensions of the leg channels and provide substantially flush surfaces.

While I have illustrated the trestle leg assembly of my invention as part of a trestle or horse, it is to be understood that it is adaptable to other uses such as in scaffolding and the like. Where the assembly is to be used upon finished floors such as in setting up banquet tables in hotels, a foot of rubber, fabric or similar soft material can be applied over feet 36.

It is to be understood that my invention may be embodied in other specific forms without departing from the spirit thereof. The present embodiment is therefore to be considered as illustrative and not restrictive, the scope of the invention being indicated by the claims rather than by the foregoing description. All changes which come within the meaning and range of equivalency of the claims are therefore intended to be embraced therein.

Having described my invention, I claim:

1. A foldable trestle leg assembly for use in supporting a cross bar at the top thereof, comprising: a pair of channel-shaped legs pivotally connected relative to one another adjacent their upper ends; means below the pivotal connection including a toggle assembly for expanding the legs below the pivotal connection and locking the legs with the upper ends thereof in predetermined spaced relation to grip a cross bar; a separate channel section of larger size than the legs nested about the lower end of each leg, each leg being formed on its inner face adjacent the lower end thereof with a plurality of inwardly and upwardly extending notches, each separate channel section being provided with a pin arranged to be engaged in one of said notches when in adjusted position and nested about the leg; and means to lock each channel section in such adjusted position.

2. The assembly of claim 1 wherein the upper ends of the separate channel sections are cut away to enable each section to pivot about the pin and the pin to be removed from the engaging notch when the channel is unlocked to enable movement of the pin into another selected notch.

3. A foldable trestle leg assembly for use in supporting a cross bar at the top thereof, comprising: a pair of channel-shaped legs positioned with their open faces facing inwardly; a link of less width than the channel and having its ends secured in the channels to pivotally connect said legs; and a toggle assembly below said link including separate links of less width than the channels and having their ends secured in the channels to expand the legs below the pivotal connection and lock the legs in expanded position with the upper ends thereof in predetermined spaced relation to grip a cross bar, the portions of the channels adjacent the ends of the links being indented to form link engaging sections of approximately the same width as the thickness of the links.

4. A foldable trestle leg assembly of the type adapted to receive a cross bar at its upper end and to be outwardly inclined in its operative bar supporting position at an angle to a vertical plane passing transversely through the bar at the upper end of the assembly, comprising: a pair of downwardly diverging outwardly inclined legs operatively arranged with their upper ends horizontally spaced to receive a cross bar; a link adjacent to the bottom of the bar receiving space for connecting the diverging legs pivotally to each other; a toggle assembly spaced substantially below the link for releasably locking the legs in diverging relationship; and a pair of L-shaped members arranged in opposed relationship in the bar receiving space between the upper ends of the legs and secured thereto, to provide the sides and bottom of an upwardly open bar receiving channel, said members being positioned when the downwardly diverging legs are in their outwardly inclined bar supporting position to present a pair of opposed substantially vertical side rails for engaging and pressing against opposite side faces of a supported bar, and a pair of adjacent substantially horizontal shelves for engaging adjacent portions of the bottom face of the bar, said link pivotally connected to one leg and rigidly connected to the other leg to extend horizontally from one leg to the other in the operative bar supporting position of the assembly; and said horizontal shelves resting against the upper edge of said link when the trestle is in its operative bar supporting position.

5. The trestle leg assembly of claim 4 wherein the upper end portion of each leg is in the form of a channel which opens inwardly toward said bar receiving space, the inward edges of the channel being shaped to extend vertically in the operative bar supporting position of the trestle; and each rail rests against the vertical inner edges of the channel adjacent to it and is provided with a somewhat centrally disposed rigid securing lug extending into the channel of the leg adjacent to it; and means for securing said lug in said channel.

6. A foldable trestle leg assembly of the type adapted to receive a cross bar at its upper end and to be outwardly inclined, in its operative bar supporting position, at an angle to a vertical plane passing transversely through the bar at the upper end of the assembly, comprising: a pair of downwardly diverging, outwardly inclined legs operatively arranged with their upper ends horizontally spaced to receive and support a cross bar; the upper end portion of each leg being in the form of a channel which opens inwardly toward said bar receiving space, the inward edges of the channel being shaped to extend vertically in the operative bar-supporting position of the trestle; a link adjacent the bottom of the bar receiving space for connecting the diverging legs pivotally to each other; a toggle assembly spaced substantially below the link for releasably locking the legs in diverging relationship; and a pair of L-shaped members arranged in opposed relationship in the bar receiving space between the upper ends of the legs, to provide the sides and bottom of an upwardly open bar-receiving channel, said members being positioned, when the downwardly diverging legs are in their outwardly-inclined bar-supporting position, to present a pair of opposed substantially vertical side rails for engaging and pressing against opposite side faces of a supported bar and a pair of adjacent substantially horizontal shelves for engaging adjacent portions of the bottom face of the bar; each rail resting against the vertical inner edges of the channel adjacent to it and being provided with a somewhat centrally disposed rigid securing lug extending into the channel of the leg adjacent to it; and means for securing said lug in said channel.

MARY W. IMES,
*Executrix of the Estate of Harry B. Imes, Deceased.*

REFERENCES CITED

The following references are of record in the file of this patent:

UNITED STATES PATENTS

| Number | Name | Date |
|---|---|---|
| 657,648 | Davidson | Sept. 11, 1900 |
| 1,682,671 | Gooding | Aug. 28, 1928 |
| 2,158,939 | Hussey | May 16, 1939 |
| 2,198,956 | Thielepape | Apr. 30, 1940 |